United States Patent
Qiu

(10) Patent No.: US 11,938,403 B2
(45) Date of Patent: Mar. 26, 2024

(54) GAME CHARACTER BEHAVIOR CONTROL METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Weibin Qiu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 150 days.

(21) Appl. No.: 17/728,963

(22) Filed: Apr. 25, 2022

(65) Prior Publication Data

US 2022/0249952 A1 Aug. 11, 2022

Related U.S. Application Data

(63) Continuation of application No. PCT/CN2021/080411, filed on Mar. 12, 2021.

(30) Foreign Application Priority Data

Apr. 28, 2020 (CN) .......................... 202010349628.8

(51) Int. Cl.
*A63F 13/57* (2014.01)
*A63F 13/56* (2014.01)

(52) U.S. Cl.
CPC .............. *A63F 13/57* (2014.09); *A63F 13/56* (2014.09); *A63F 2300/65* (2013.01); *A63F 2300/6623* (2013.01)

(58) Field of Classification Search
CPC ...... A63F 13/57; A63F 13/56; A63F 2300/65; A63F 2300/6623
(Continued)

(56) References Cited

U.S. PATENT DOCUMENTS 7,296,007 B1 * 11/2007 Funge .................... G06N 20/00
    434/350
7,636,701 B2 * 12/2009 Funge .................... A63F 13/67
    706/45
(Continued)

FOREIGN PATENT DOCUMENTS

CN 106422332 A 2/2017
CN 108090443 A 5/2018
(Continued)

OTHER PUBLICATIONS

China National Intellectual Property Administration (CNIPA) Office Action 1 for 202010349628.8 dated May 28, 2021 14 Pages (including translation).
(Continued)

*Primary Examiner* — Allen Chan
(74) *Attorney, Agent, or Firm* — ANOVA LAW GROUP PLLC

(57) ABSTRACT

The present disclosure provides a game character behavior control method. The method includes obtaining current game state information of a game, and performing feature extraction on the current game state information to obtain first feature information that reflects parameters of game characters of opposing parties in the game; constructing second feature information associated with a target game character, the second feature information reflecting the first feature information and features of target state information associated with target game character in the current game state information, the target game character being game characters controlled by game logic; performing classification on the second feature information to obtain action probability distribution associated with the target game characters; determining target behavior information based on an action probability distribution and target state information associated with the target game character; and con-
(Continued)

trolling the target game character to perform actions corresponding to the target behavior information.

20 Claims, 8 Drawing Sheets

(58) Field of Classification Search
    USPC .......................................................... 463/43
    See application file for complete search history.

(56) References Cited

U.S. PATENT DOCUMENTS

| | | | |
|---|---|---|---|
| 9,978,202 B2* | 5/2018 | Keilwert | .............. H04N 13/366 |
| 2004/0018478 A1* | 1/2004 | Styles | ...................... G09B 5/00 |
| | | | 434/350 |
| 2019/0205757 A1 | 7/2019 | Blundell et al. | |
| 2020/0234145 A1* | 7/2020 | Dai | ..................... G06F 18/2413 |

FOREIGN PATENT DOCUMENTS

| | | |
|---|---|---|
| CN | 108888958 A | 11/2018 |
| CN | 109034397 A | 12/2018 |
| CN | 109621431 A | 4/2019 |
| CN | 109908591 A | 6/2019 |
| CN | 110147883 A | 8/2019 |
| CN | 111632379 A | 9/2020 |

OTHER PUBLICATIONS

The World Intellectual Property Organization (WIPO) International Search Report for PCT/CN2021/080411 dated Jun. 23, 2021 6 Pages (including translation).

* cited by examiner

GAME CHARACTER BEHAVIOR CONTROL METHOD AND APPARATUS, STORAGE MEDIUM, AND ELECTRONIC DEVICE

RELATED APPLICATIONS

The present disclosure is a continuation application of PCT Application No. PCT/CN2021/080411, filed on Mar. 12, 2021, which claims priority to Chinese Patent Application No. 202010349628.8, entitled "GAME CHARACTER BEHAVIOR CONTROL METHOD AND APPARATUS, STORAGE MEDIUM, AND ELECTRONIC DEVICE" and filed with the China National Intellectual Property Administration on Apr. 28, 2020. The two applications are both incorporated by reference in their entirety.

FIELD OF THE TECHNOLOGY

The present disclosure relates to the field of artificial intelligence technologies, and specifically, to a game character behavior control method, a game character behavior control apparatus, a computer-readable storage medium, and an electronic device.

BACKGROUND OF THE DISCLOSURE

With the emergence and development of online games, there are increasingly more types of online games, and a multiplayer role-playing game (RPG) is one of the online games. In all role-playing games, a player needs to play a fictional role and control many activities of the role. The RPG is usually a turn-based game. After a round of turn-based game is started, a plurality of battle characters (where the plurality of battle characters include player characters or may include non-player characters (NPCs)) participating in the round of turn-based game take turn of the character in a specific sequence, and the character can perform operations only when the character takes its turn.

Behaviors of the NPCs are usually determined based on a simple artificial intelligence (AI) method when the battle characters include the NPCs. A decision tree method and a supervised learning method are currently used. However, skill casting actions generated by using the decision tree method are relatively fixed and singular, and consequently, it is difficult to match a skill level of human players, which impairs the player experience. In addition, when there are a great quantity of game characters, respectively constructing a behavior tree for each character takes an extremely long time.

The information disclosed in the background part is merely used for enhancing the understanding of the background of the present disclosure. Therefore, information that does not constitute a limitation to the related art known to a person of ordinary skill in the art may be included.

SUMMARY

Embodiments of the present disclosure provide a game character behavior control method, a game character behavior control apparatus, a computer-readable storage medium, and an electronic device, to improve an intelligent battle level of existing non-player characters (NPCs) to at least some extent, improve playability of games, and further improve user experience.

Other features and advantages of the present disclosure will become apparent in the following detailed description, or may be partially learned in the practice of the present disclosure.

One aspect of this embodiment of the present disclosure provides a game character behavior control method. The method includes obtaining current game state information of a game, and performing feature extraction on the current game state information to obtain first feature information that reflects parameters of game characters of opposing parties in the game; constructing second feature information associated with a target game character, the second feature information reflecting the first feature information and features of target state information associated with target game character in the current game state information, the target game character being game characters controlled by game logic; performing classification on the second feature information to obtain action probability distribution associated with the target game characters; determining target behavior information based on an action probability distribution and target state information associated with the target game character; and controlling the target game character to perform actions corresponding to the target behavior information.

Another aspect of this embodiment of the present disclosure provides a game character behavior control apparatus. A game character behavior control apparatus, comprising: a memory and a processor coupled to the memory. The processor is configured to obtain current game state information of a game, and performing feature extraction on the current game state information, to obtain first feature information that reflects parameters of game characters of opposing parties in the game; construct second feature information associated with a target game character, the second feature information reflecting the first feature information and features of target state information associated with target game character in the current game state information, the target game character being game characters controlled by game logic; perform classification on the second feature information to obtain action probability distribution associated with the target game characters; determine target behavior information based on an action probability distribution and target state information associated with the target game character; and control the target game character to perform actions corresponding to the target behavior information.

According to an aspect of the embodiments of the present disclosure, a non-transitory computer-readable storage medium is provided, storing a computer program, the program, when executed by a processor, implementing the game character behavior control method described in the foregoing embodiment.

According to technical solutions provided in the embodiments of the present disclosure, current game state information of a game is first obtained, and feature extraction is performed on the current game state information to obtain first feature information; second feature information associated with a target game character is constructed according to target state information associated with the target game character in the first feature information and the current game state information; subsequently, feature extraction is performed on the second feature information to obtain an action probability distribution associated with the target game character; and finally, the target behavior information associated with the target game character is determined based on the action probability distribution and the target state information. According to the technical solutions of the present disclosure, the intelligence of skill casting of game characters in a game can be improved, to match a game level of a human player and improve intelligence of game logic, thereby improving user experience.

It is to be understood that the foregoing general descriptions and the following detailed descriptions are merely for illustration and explanation purposes and are not intended to limit the present disclosure.

BRIEF DESCRIPTION OF THE DRAWINGS

The accompanying drawings herein are incorporated into this specification and constitute a part of the specification, show embodiments that conform to the present disclosure, and are used for describing principles of the present disclosure together with the specification. Apparently, the accompanying drawings in the following description show merely some embodiments of the present disclosure, and a person of ordinary skill in the art may still derive other drawings according to such accompanying drawings without creative efforts. In the accompanying drawings.

DESCRIPTION OF EMBODIMENTS

Exemplary embodiments are described more comprehensively with reference to the accompanying drawings. However, the exemplary embodiments can be implemented in various forms, and are not constructed as a limitation to examples described herein. Instead, the embodiments are provided to make the present disclosure more comprehensive and complete, and comprehensively convey the concept of the exemplary embodiments to a person skilled in the art.

In addition, the described features, structures, or characteristics may be combined in one or more embodiments in any appropriate manner. In the following descriptions, many specific details are provided to obtain thorough understanding of the embodiments of the present disclosure. However, a person skilled in the art is to be aware that, one or more specific details may be omitted during embodiment of technical solutions of the present disclosure, or another method, component, apparatus, step, or the like may be used. In other cases, well-known methods, apparatuses, embodiments, or operations are not shown or described in detail, to avoid obscuring aspects of the present disclosure.

Block diagrams shown in the accompanying drawing are merely functional entities and do not necessarily correspond to physically independent entities. In other words, the functional entities may be implemented in a software form, or may be implemented in one or more hardware modules or integrated circuits, or may be implemented in different networks and/or processor apparatuses and/or microcontroller apparatuses.

Flowcharts shown in the accompanying drawings are merely exemplary descriptions and do not need to include all content and operations/steps, and do not need to be performed in the described orders either. For example, some operations/steps may be further divided, while some operations/steps may be combined or partially combined. Therefore, an actual execution order may change according to an actual situation.

Figure 1:
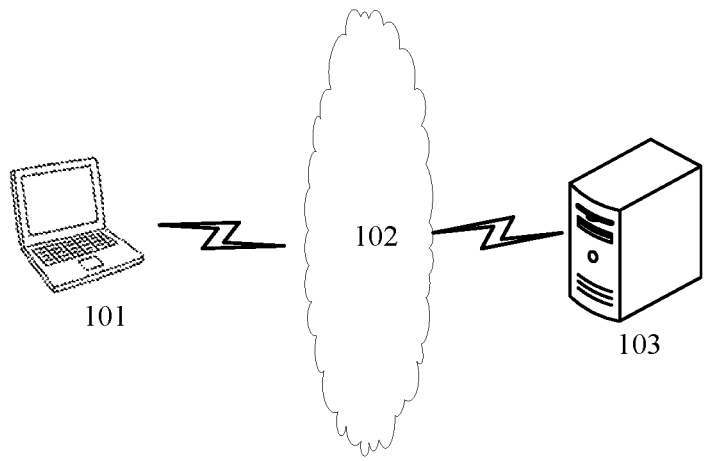
FIG. 1 is a schematic diagram of a system architecture to which technical solutions of embodiments of the present disclosure is applicable.

FIG. 1 is a schematic diagram of a system architecture to which technical solutions of embodiments of the present disclosure is applicable.

As shown in FIG. 1, a system architecture 100 of a game character behavior control system may include a terminal device 101, a network 102, and a server 103. The network 102 is configured to provide a medium of a communication link between the terminal device 101 and the server 103. The network 102 may include various connection types, for example, a wired communication link, a wireless communication link, and the like.

It is to be understood that the quantities of terminal devices, networks, and servers in FIG. 1 are merely exemplary. There may be any number of terminal devices, networks, and servers according to actual requirements. For example, the server 103 may be a server cluster including a plurality of servers. The terminal device 101 may be a terminal device having a display screen, such as a notebook computer, a portable computer, or a desktop computer.

In an embodiment of the present disclosure, games are installed on the terminal device 101. A user may log in to a game platform and play a game on the terminal device 101. The game may specifically be a turn-based game, a multiplayer turn-based role-playing game (RPG), or the like. Generally, in the multiplayer turn-based RPG, in addition to battling with human players, the human players may also battle with non-player characters (NPCs). During the battle with the human players, the NPCs need to perform corresponding skill casting according to skill casting of the human players, to ensure that the game is played smoothly without affecting game experience of the human players. Since the NPCs do not have the capability of thinking, a specific mean is necessarily used to help the NPCs cast skills intelligently.

In one embodiment of the present disclosure, training may be performed on a reinforcement learning network model, and feature extraction may be performed on current game state information by using the reinforcement learning network model, to quickly generate intelligent NPCs in game levels. During generation of target behavior information corresponding to the current game state information by using the reinforcement learning network model, game state information of a game at a current moment, that is, the current game state information may be first obtained. The current game state information includes category information, attribute information, skill state information, and teamwork information of characters in both camps. The teamwork information is specifically position information of the characters. Feature extraction is performed on the current game state information by using an actor network model of the reinforcement learning network model, to obtain first feature information. The first feature information is used for describing features of parameter values of a plurality of parameters of opposing parties in a current game. The plurality of parameters may include various parameters used for describing the category information, the attribute information, the skill state information, and the position information of the game characters. The first feature information is global state information of a current game. After the first feature information is obtained, second feature information corresponding to the NPC is constructed according to target state information corresponding to the NPC in the first feature information and the current game state information. The second feature information is used for describing features of target state information corresponding to a target game character in the first feature information and the current game state information. The target game character is a game character currently controlled by game logic. Classification may be performed on the second feature information by using the actor network model, to obtain an action probability distribution of the NPC. The action probability distribution includes a skill identifier and a corresponding probability value. Target behavior information of the NPC may be determined according to the action probability distribution and the target state information. The target behavior information includes a main action target and a to-be-cast skill of the NPC. In this embodiment of the present disclosure, since there are a plurality of characters in both camps in the multiplayer turn-based RPG, a plurality of network branches are set for the reinforcement learning network model to perform classification on the second feature information, so that the action probability distribution corresponding to each NPC is obtained, and the target behavior information corresponding to the NPC is outputted according to the action probability distribution corresponding to each NPC.

According to the technical solutions of this embodiment of the present disclosure, on the one hand, intelligent skill casting of the game character can be generated based on the reinforcement learning network model, so that an intelligent battle level of the NPC is improved, and the level of the NPC matches the level of the human player, thereby improving playability of games and further improving user experience. On the other hand, the skill casting of the game character is generated without using a decision tree method and a supervised learning method, which consumes less time. In addition, intelligent skill casting of the game character may be implemented without acquiring a large amount of real game data.

The game character behavior control method provided in this embodiment of the present disclosure may be implemented by the server, and correspondingly, a game character behavior control apparatus may be configured in the server. In other embodiments of the present disclosure, the game character behavior control method provided in this embodiment of the present disclosure may alternatively be implemented by the terminal device.

In the related art of the field, a decision behavior tree method is still used for most online artificial intelligence (AI) in the current multiplayer turn-based RPG. In the decision behavior tree method, a tree structure is usually established by selecting relevant features. Each child node of a parent node represents all skill casting policies of the child node. According to understanding of character attributes and features, a game planner artificially sets a set of condition rules for each character to determine which type of action to be performed at a current moment. In addition, AI for a small quantity of game characters is implemented based on the supervised learning method. The embodiment premise of such a method is acquiring a large amount of behavior data of the human players from a real game scene, constructing a deep neural network, and fitting an output probability distribution of the model.

However, there are relevant problems in the method provided in the related art. AI for the characters constructed by using the decision behavior tree method generally has lower intelligence, and skill casting actions produced are usually relatively fixed and single. Consequently, it is difficult to match a game level of the human player, and good experience cannot be provided to the players. Further, when there are a great quantity of game characters, respectively constructing a behavior tree for each character takes an extremely long time. During actual embodiment, the supervised learning method usually fails to be performed due to difficult acquisition of real game data, or is limited to existing data. Consequently, on the one hand, a phenomenon of over-fitting is prone to occur, and the characters may only generate single actions; and on the other hand, generalization cannot be ensured, and inconceivable misoperations are likely to be generated in the real game scene. Therefore, it is difficult to enable the characters to have a higher level by using such a method.

In view of existing problems in the related art, the embodiments of the present disclosure provide a game character behavior control method. The game character behavior control method is implemented by using a machine learning model and relates to the field of artificial intelligence technologies. Artificial intelligence (AI) is a theory, method, technology, and application system in which a digital computer or a machine controlled by a digital computer is used to simulate, extend, and expand human intelligence, sense an environment, acquire knowledge, and use the knowledge to obtain an optimal result. In other words, AI is a comprehensive technology of computer science, which attempts to understand the essence of intelligence and produce a new type of intelligent machine that can react in a similar way to human intelligence. AI is to study design principles and embodiment methods of various intelligent machines, so that the machines have the functions of perception, reasoning, and decision-making.

The AI technology is a comprehensive discipline, covering a wide range of technologies including both hardware-level technologies and software-level technologies. The basic AI technology generally includes a technology such as a sensor, a dedicated AI chip, cloud computing, distributed storage, a big data processing technology, an operation/interaction system, or mechatronics. The AI software technology mainly includes several major directions such as a computer vision (CV) technology, a speech processing technology, a natural language processing (NLP) technology, and machine learning (ML)/deep learning.

CV is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific subject, CV studies related theories and technologies, and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

ML is a multi-field interdiscipline, and relates to a plurality of disciplines such as the probability theory, statistics, the approximation theory, convex analysis, and the algorithm complexity theory. The machine learning specializes in studying how a computer simulates or implements a human learning behavior to obtain new knowledge or skills, and reorganize an existing knowledge structure, to keep improving its performance. The machine learning is a core of the AI, is a basic way to make the computer intelligent, and is applicable to various fields of AI. The machine learning and deep learning generally include technologies such as an artificial neural network, a belief network, reinforcement learning, transfer learning, inductive learning, and learning from demonstrations.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

The solutions provided in the embodiments of the present disclosure relate to ML technologies of AI, and are specifically described by using the following embodiments.

Figure 2A:
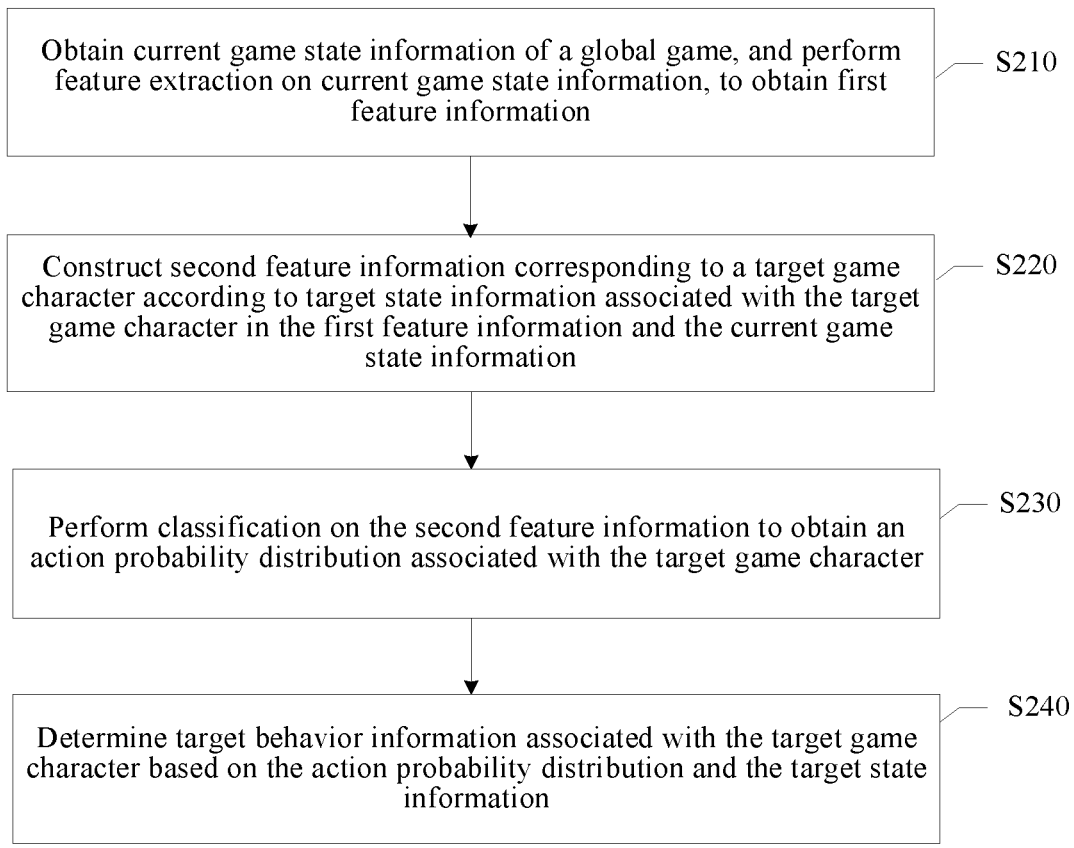
FIG. 2A is a schematic flowchart of a game character behavior control method according to an embodiment of the present disclosure.

FIG. 2A is a flowchart of a game character behavior control method according to an embodiment of the present disclosure. The game character behavior control method may specifically be implemented by a server, and specifically is implemented by the server 103 shown in FIG. 1. Referring to FIG. 2A, the game character behavior control method at least includes step S210 to step S240. A detailed description is as follows:

Step S210: Obtain current game state information of a game, and perform feature extraction on the current game state information, to obtain first feature information.

According to an embodiment of the present disclosure, during a game, an NPC needs to determine a skill casting action according to state information of an opposing camp and state information of our camp at each moment. In this embodiment of the present disclosure, for ease of description, the opposing camp may be marked as a first camp, and the our camp, that is, an NPC camp may be marked as a second camp. To determine a skill casting action of the NPC in a current game scene, state information of the game at a current moment, that is, the current game state information needs to be obtained, and the skill casting action, that is, target behavior information of the NPC is then determined according to the current game state information.

In an embodiment of the present disclosure, the game state information may specifically include the following major types: category information, attribute information, skill state information, and position information of game characters in the first camp, and category information, attribute information, skill state information, and position information of game characters in the second camp. The position information of the game characters in the first camp is used for representing teamwork information of the first camp, and the position information of the game characters in the second camp is used for representing teamwork information of the second camp.

When the current game state information of the game is determined, the first camp and the second camp in a current game level may be first determined. The second camp includes a plurality of target game characters. The target game characters may be the NPCs, that is, the first camp is a camp including human players, and the second camp is a camp including the NPCs. Subsequently, the category information, the attribute information, the skill state information, and the position information of the game characters in the first camp may be obtained, and the category information, the attribute information, the skill state information, and the position information of the target game characters in the second camp may be simultaneously obtained. Finally, a state vector is constructed according to the category information, the attribute information, the skill state information, and the position information of the game characters in the first camp, and the category information, the attribute information, the skill state information, and the position information of the target game characters in the second camp. The state vector is the current game state information of the game.

The category information of the game characters may be understood as occupations of the game characters, the skill state information represents which current skills can be used and which cannot be used by the game characters, the teamwork information is the position information of the characters in the camps. Using a turn-based level battle scene of Fairy Tail: Mage Boy as an example, both a first camp and a second camp in each level include five game characters. When a specific turn is started, relevant information of 10 characters needs to be extracted and constructed as a multi-dimensional vector by embedding combinations, to be used as the current game state information. The current game state information specifically includes:

(1) Occupation: The game includes 11 occupations: power, dressing, healing, potion, snow dancing, sound wave, text, speed, psychedelic butterfly, and lava. In this embodiment of the present disclosure, the occupations of the game characters are represented in a one-hot form. For example, a game character is a potion mage, and a representation form of the potion mage is [0,0,0,1,0,0,0,0,0,0,0]. That is, category information of a single game character is 11-dimensional information.

(2) Attribute information represents a current attribute of the game character. The attribute information of the game includes a health point, a magic point, a rage point, a physical attack capacity value, a magic attack capacity value, a healing capacity value, or the like. The strength of the attribute directly affects an attacking capacity or a defense capacity of the character. The attribute information of the game character may change during the battle, and the health point is the most important attribute information. In the RPG, the health point represents health of the character. For example, it indicates that the character is killed when the health point is reduced to 0. The attribute information is continuous values, attribute information of different characters is different, and values between different attributes of the same character are quite different. Therefore, specific normalization processing needs to be performed on the attribute information. Specifically, attribute information corresponding to a current game character may be divided by initial attribute information of the game character, to normalize the attribute information. The initial attribute information of the game character and initial attribute information of the same type of attributes of another game character may be the same or different. For example, health points of all characters are 100 at the beginning of the game. A health point of the potion mage is reduced to 50 in a specific turn of a specific level, and the health point of 50 may be divided by the health point 100 to normalize the health point of the potion mage to 0.5. Alternatively, the health point of the potion mage is 100 at the beginning of the game. Different from a health point of another character, the health point of the potion mage is reduced to 50 in a specific turn of a specific level, and the health point of 50 in the specific turn may be divided by the health point of 100 at the beginning to normalize the health point of the potion mage to 0.5. According to a category of the attribute information, it may be determined that various types of attribute information of a single game character occupy 20 dimensions.

(3) Skill state information represents a currently available skill of the character. Such information limits a legitimate action space of the character in a current turn, and therefore, it is necessary to list the skill state information into the game state information. The skill state information is represented in a form of 0-1. Specifically, 0 indicates that a skill is unavailable, and 1 indicates that the skill is available. Certainly, 0 and 1 may be interchanged to indicate whether the skills are available, and this embodiment of the present disclosure is not limited thereto. Different characters have different quantities of skills, and each character may have several identical skills. Therefore, the skill state information may be set to be 20-dimensional.

(4) Position information refers to a position of each character in a camp in the game scene. Teamwork information of the camp may be represented according to position information of different characters in the same camp. Specifically, different positions have different attribute bonuses for the same character. In addition, from a perspective of universality, another game may also have similar team information, and therefore, such information also needs to be considered during construction of the current game state information. For position information of lineups of the game, considering that there are only nine positions, whether the characters are located at specific positions is indicated in the form of 0-1. For example, [1,1,1,1,1,0,0,0,0] indicates that the first five positions are enabled in the camp. That is, position information of a single camp including five characters occupies nine dimensions.

According to the information of the foregoing four aspects and other auxiliary adjustment information, a state vector having a total dimension of 469 dimensions may be constructed to be used as the current game state information. Certainly, the current game state information is not limited to 469 dimensions, or may be another dimension greater than or equal to the dimension of the vector constructed according to the information of four aspects, which depends on selection of the other auxiliary adjustment information by a model designer during actual applications.

Figure 3:
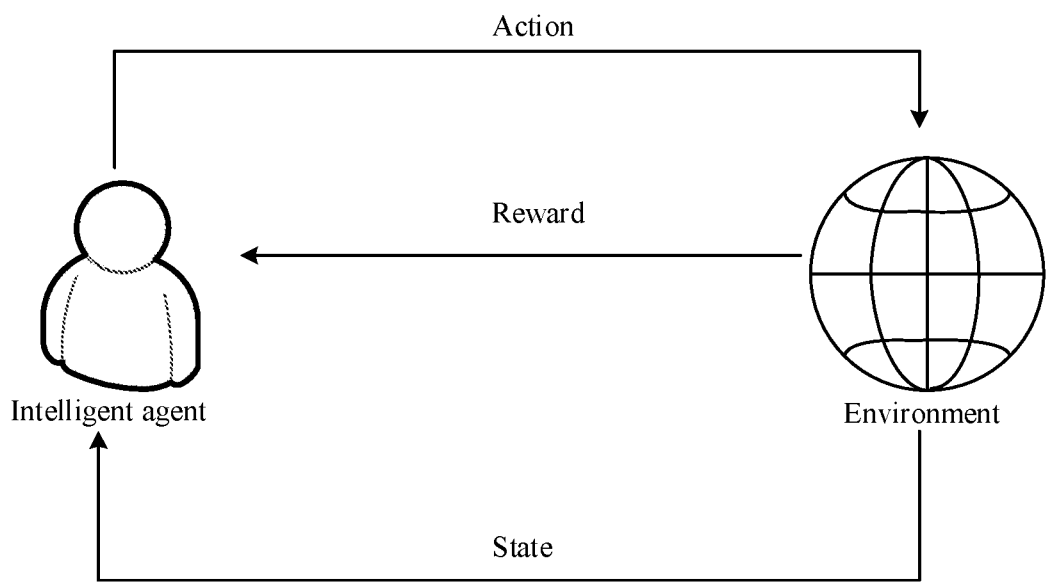
FIG. 3 is a schematic diagram of a system architecture for reinforcement learning according to an embodiment of the present disclosure.

In an embodiment of the present disclosure, after the current game state information is obtained, feature extraction may be performed on the current game state information by using a machine learning model, to obtain target behavior information corresponding to a target game character. In this embodiment of the present disclosure, the machine learning model is specifically a reinforcement learning network model. The reinforcement learning network model emphasizes how to act based on an environment to maximize expected benefits. FIG. 3 is a schematic diagram of a system architecture for reinforcement learning. As shown in FIG. 3, a process of reinforcement learning includes an interaction between an intelligent agent and an environment. The environment is an external system. The intelligent agent is a system embedded into the environment and is capable of changing a state by taking actions. The state refers to state information at a moment in a current environment. During the interaction between the intelligent agent and the environment, the intelligent agent can output a corresponding action according to a current state and a current policy. The action may be applied to the environment, so that the environment may calculate a corresponding reward value according to the action, and feed back the reward value and a state at a next moment to the intelligent agent, to enable the intelligent agent to change the policy according to the reward value and the state and output a new action. Such process is repeated until expected reward values are obtained. The reward value may be positive or may be negative. When a positive reward of the environment is generated due to a specific behavior policy of the intelligent agent, the intelligent agent has an increasing tendency to generate the behavior policy. The intelligent agent aims to find an optimal policy at each discrete state to maximize a sum of the expected reward values.

In an embodiment of the present disclosure, in a game scene, each game character may be considered as an intelligent agent, an intelligent skill casting task of the game character may be considered as a standard reinforcement learning issue, and the game character interacts with a game environment based on given actions of a policy model, to maximize a regard target of the game character. The reward target includes killing and injuring characters of an opposing camp to win a battle. In this embodiment of the present disclosure, a plurality of characters of a single camp are considered as a large intelligent agent, and there are a plurality of independent output channels in an intelligent agent decision output stage which are respectively correspond to actions of the characters in the single camp. Using Fairy Tail: Mage Boy as an example, each camp includes five characters, and the five characters may be considered as a large intelligent agent. Five independent output channels are set in the decision output stage to respectively output the actions of the game characters. Compared with a structure design in which the plurality of characters of the single camp are considered as a plurality of intelligent agents, such a structure design may avoid information collaborative interaction between the intelligent agents and difficult convergence during training.

In an embodiment of the present disclosure, an AC network framework training model may be used in the reinforcement learning network model. In other words, the reinforcement learning network model includes an actor network model and a critic network model. The actor network model performs training on a current policy, that is, predicts an action of a target game character, that is, target behavior information according to the current game state information. The critic network model learns a value function, and outputs a current state value to assess the state. In other words, during training, the critic network model assesses benefits that can be expected to be obtained in an entire battle in a current game state.

Figure 4:
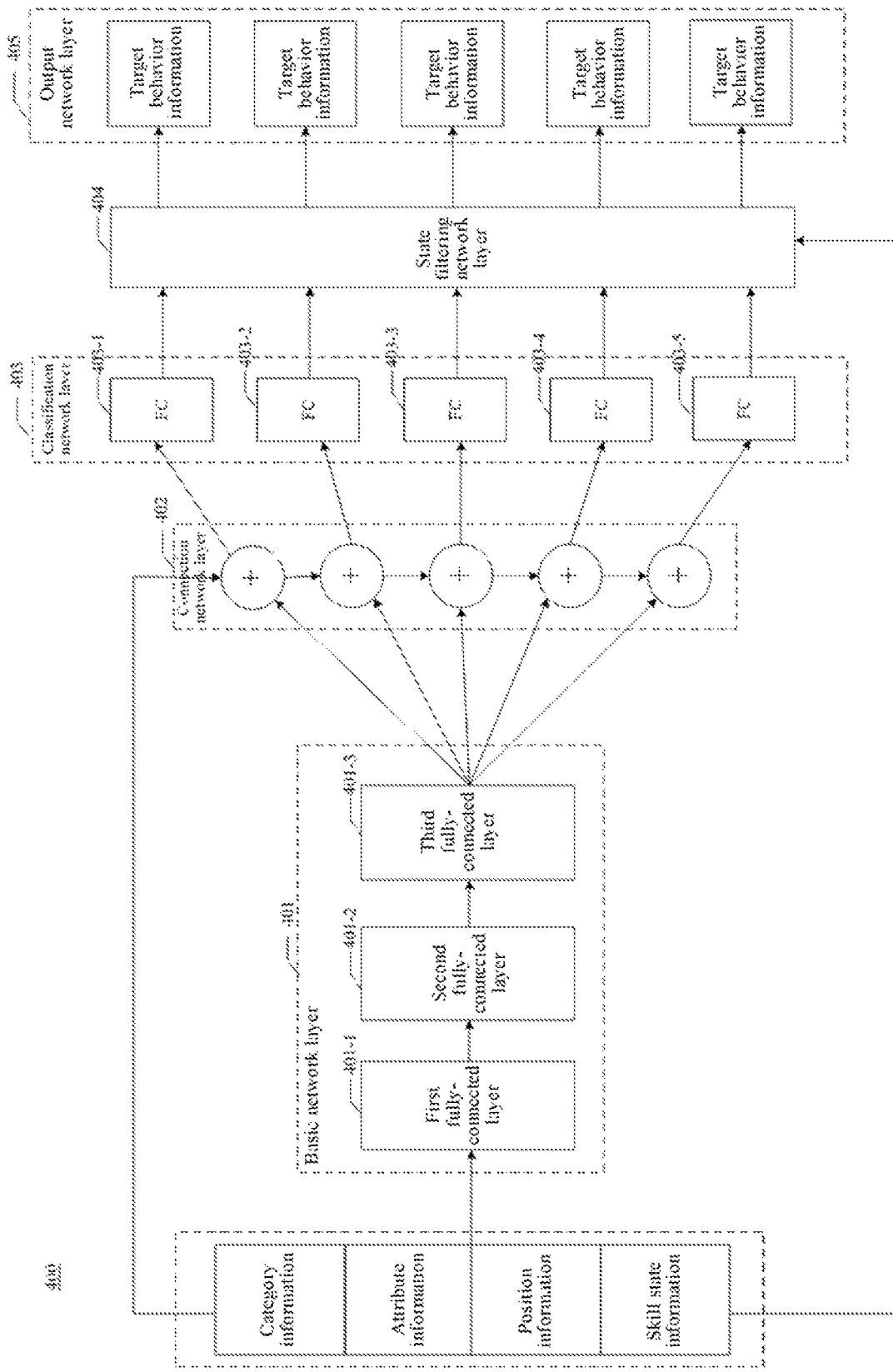
FIG. 4 is a schematic structural diagram of an actor network model according to an embodiment of the present disclosure.

In an embodiment of the present disclosure, FIG. 4 is a schematic structural diagram of an actor network model. As shown in FIG. 4, an actor network model 400 includes a basic network layer 401, a connection network layer 402, a classification network layer 403, a state filtering network layer 404, and a behavior output network layer 405. The basic network layer 401 is configured to perform feature extraction on the current game state information, to obtain first feature information. The connection network layer 402 is configured to connect the first feature information to the category information corresponding to the target game character, to obtain second feature information. The classification network layer 403 is configured to perform classification on the second feature information, to obtain an action probability distribution corresponding to the target game character. The state filtering network layer 404 is configured to screen invalid skills in the action probability distribution according to the skill state information corresponding to the target game character, to obtain a valid action probability distribution. The behavior output network layer 405 is configured to determine the target behavior information corresponding to the target game character according to the valid action probability distribution.

In an embodiment of the present disclosure, the basic network layer 401 includes a first fully-connected layer 401-1, a second fully-connected layer 401-2, and a third fully-connected layer 401-3. Specifically, a dimension of the first fully-connected layer 401-1 is 1024, a dimension of the second fully-connected layer 401-2 is 512, and a dimension of the third fully-connected layer is 256. In this embodiment of the present disclosure, the basic network layer 401 is formed by setting three fully-connected layers whose dimensions are sequentially reduced, so that a nonlinear problem can be resolved well, and extraction efficiency and accuracy of the first feature information can be improved. The classification network layer 403 includes a plurality of sub-classification networks, and a quantity of sub-classification networks is the same as a quantity of target game characters. In other words, each child classification network is configured to output an action probability distribution corresponding to one target game character. Using the game described in the foregoing embodiments as an example, there are five game characters in an NPC camp. To obtain actions of five NPCs, five sub-classification networks may be set in the classification network layer 403, which are respectively marked as 403-1, 403-2, 403-3, 403-4, and 403-5. Further, the sub-classification networks may specifically be a fully-connected layer, and a dimension of the fully-connected layer is related to a dimension of skill information of the target game character and a quantity of main action targets (that is, game characters to which skills of the target game character can be applied), for example, the dimension may be set to 100, 200, or the like. A quantity and a dimension of the fully-connected layer in the basic network layer 401 may further be set to another value according to actual requirements, and this embodiment of the present disclosure is not specifically limited thereto. The quantity of sub-classification networks in the classification network layer 403 in the actor network model changes with the quantity of target game characters, and includes but is not limited to five mentioned in the foregoing embodiments.

In an embodiment of the present disclosure, after the current game state information is obtained, the current game state information may be inputted into the basic network layer 401 of the actor network model 400, and multi-level feature extraction is performed on the current game state information by using the basic network layer 401, to obtain the first feature information. Specifically, after receiving the current game state information, the basic network layer 401 may sequentially perform feature extraction on the current game state information by using the included three fully-connected layers 401-1, 401-2, and 401-3. In other words, feature extraction is first performed on the current game state information by using the fully-connected layer 401-1, to obtain primary feature information; feature extraction is then performed on the primary feature information by using the second fully-connected layer 401-2, to obtain secondary feature information; and finally, feature extraction is performed on the secondary feature information by using the third fully-connected layer 401-3, to obtain the first feature information. The first feature information is substantially global state information corresponding to a game scene at a current moment. The primary feature information, the secondary feature information, and the first feature information are all feature information corresponding to the current game state information, but respective dimensions are different.

Step S220: Construct second feature information corresponding to the target game character according to target state information corresponding to the target game character in the first feature information and the current game state information.

In an embodiment of the present disclosure, the basic network layer 401 may transmit the first feature information to the connection network layer 402 after obtaining first feature information according to the current game state information, and then the connection network layer 402 may construct the second feature information corresponding to the target game character according to the target state information corresponding to the target game character in the first feature information and the current game state information. The target state information includes category information, attribute information, skill state information, and position information corresponding to the target game character. During the construction of the second feature information, specifically, the first feature information may be connected to the category information corresponding to each target game character, to form the second feature information corresponding to each target game character. The second feature information is obtained by connecting the first feature information to the category information of the target game character. Therefore, when the sub-classification networks of the classification network layer 403 perform classification on the second feature information, an action probability distribution corresponding to which target game character is outputted according to the category information, to ensure that each child classification network outputs an action probability distribution of one target game character, thereby ensuring final obtaining of target behavior information cooperated between a plurality of target game characters. The connecting the first feature information to the category information corresponding to the target game character is substantially to perform a connection operation on the first feature information and the category information, and existing arrays are not changed by such an operation. Using the game in the foregoing embodiments as an example, NPCs include five monster characters. It is assumed that there are a monster A, a monster B, a monster C, a monster D, and a monster E, when the connection operation is performed, the first feature information may be respectively connected to category information of the monster A, the monster B, the monster C, the monster D, and the monster E, to obtain second feature information respectively corresponding to the monster A, the monster B, the monster C, the monster D, and the monster E.

Step S230: Perform classification on the second feature information to obtain an action probability distribution corresponding to the target game character.

In an embodiment of the present disclosure, after the second feature information is obtained, a plurality of pieces of second feature information may be respectively inputted into the different sub-classification networks of the classification network layer 403, and classification is performed on the second feature information by using the sub-classification networks, to obtain the action probability distribution corresponding to each target game character. The action probability distribution includes skill identifiers and a probability that the target game character uses skills corresponding to the skill identifiers for skill casting.

Still using the game in the foregoing embodiments as an example, the second feature information corresponding to the monster A may be inputted into the child classification network 403-1, and classification is performed on the received second feature information by using the child classification network 403-1, to obtain an action probability distribution corresponding to the monster A. Similarly, the second feature information corresponding to the monster B, the monster C, the monster D, and the monster E may be respectively inputted into the sub-classification networks 403-2, 403-3, 403-4, and 403-5 for classification, to obtain action probability distributions respectively corresponding to the monster B, the monster C, the monster D, and the monster E.

Step S240: Determine target behavior information corresponding to the target game character based on the action probability distribution and the target state information.

In an embodiment of the present disclosure, since the target game character cannot use all skills, before final target behavior information is determined according to the action probability distribution, invalid skills in the action probability distribution need to be screened, and the final target behavior information is then determined according to the valid action probability distribution obtained after screening. Specifically, the action probability distribution may be inputted into a skill filtering network layer 404, and the skill filtering network layer 404 screens invalid skills in the action probability distribution corresponding to the target game character according to skill state information corresponding to the target game character in the target state information, to obtain a valid action probability distribution. For example, the monster A cannot use an imprison skill, a skill identifier and a probability value corresponding to the imprison skill in the action probability distribution corresponding to the monster A need to be screened, and only skill identifiers and corresponding probability values of available skills are retained.

Figure 5:
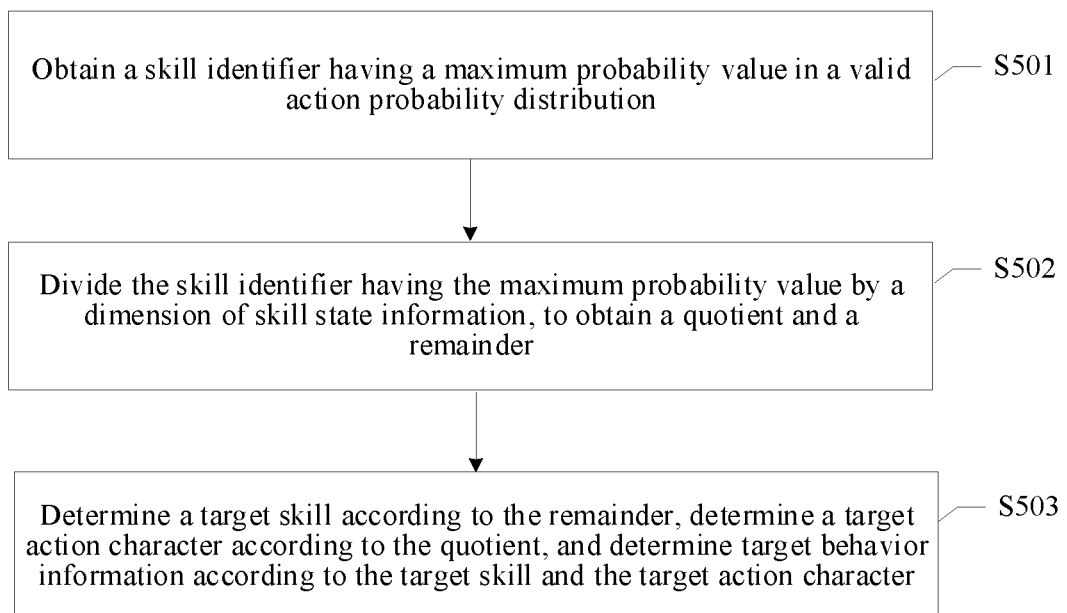
FIG. 5 is a schematic flowchart of obtaining target behavior information corresponding to target game characters according to an embodiment of the present disclosure.

In an embodiment of the present disclosure, after the valid action probability distribution is obtained, the valid action probability distribution may be inputted into the behavior output network layer 405 and is processed by using the behavior output network layer 405, to obtain the target behavior information corresponding to the target game character. FIG. 5 is a schematic flowchart of obtaining target behavior information corresponding to target game character. As shown in FIG. 5, the following steps are included. Step S501: Obtain a skill identifier having a maximum probability value in the valid action probability distribution. Step S502: Divide the skill identifier having the maximum probability value by a dimension of the skill state information, to obtain a quotient and a remainder. Step S503: Determine a target skill according to the remainder, determine a target action character according to the quotient, and determine the target behavior information according to the target skill and the target action character.

In an embodiment of the present disclosure, a probability value corresponding to a skill identifier indicates an effect of the skill as a skill casting action. It indicates that the corresponding skill has a good effect as the skill casting action when the probability value is large, and it indicates that the corresponding skill has a relatively poor effect as the skill casting action when the probability value is small. A maximum probability value and a skill identifier corresponding to the maximum probability value may be obtained after the valid action probability distribution is obtained, and the target behavior information corresponding to the target game character may be determined according to the skill identifier.

In an embodiment of the present disclosure, to avoid complexity of a model, there is no dedicated network set for predicting main targets on which the skill acts on, and instead, identifier information and skill identifiers of possible main action targets are combined to perform collaborative representation on actions (behaviors). The collaborative representation on the actions is described in detail below. Using Fairy Tail: Mage Boy mentioned above as an example, different characters have different quantities of skills, and the quantity is in a range of about 7 to 13. In addition, the skills may also be divided into an ordinary attack skill, a single-target magic attack skill, a group-target magic attack skill, an imprison skill, a healing skill, and the like. Therefore, a 20-dimensional skill representation vector may be set according to categories of skills and the quantities of the skills, a corresponding skill is set for each dimension in the skill representation vector, and a plurality of skills of the game characters are sequentially arranged according to the categories of the skills. For example, the first dimension represents the ordinary attack skill of all characters, and the second to fourth dimension represent the single-target magic attack skill. Certainly, not every dimension corresponds to a specific skill. For example, a specific character has only two single-target magic attack skills, which are respectively mapped to the second dimension and the third dimension, and a no-skill tag is set for the fourth dimension.

In an embodiment of the present disclosure, in a multi-player battle scene, for example, a 5v5 scene of Fairy Tail: Mage Boy, in addition to selecting skills for casting, the game character also needs to determine a main character on which the skills act, that is, which game character the skills are applied to. Theoretically, the main character on which the skills can act is any one of all characters on a game battlefield. However, considering characteristics of each skill, the each skill may be marked as an attack skill or a defense skill. The attack skill only acts on one of a plurality of characters in the opposing camp (the first camp), and the defense skill only acts on one of a plurality of characters in the our camp (the second camp). Therefore, in this embodiment of the present disclosure, the action space is expanded according to a quantity of elements of the skill representation vector and a quantity of targets on which the skills can act, to implement collaborative representation of the actions. For example, the skill representation vector is a 20-dimensional vector, there are five targets on which the defense skill or the attack skill can act, and the action space may be expanded to 100 dimensions, that is, an action output for each character is to be a 100-dimensional probability distribution. The collaborative representation on the actions mentioned above is to combine the identifier information and the skill identifiers of the possible main action targets. In this embodiment of the present disclosure, the identifier information of the main action targets may be identifier information formed by sequentially numbering the main action targets from 0. For example, there are five game characters a, b, c, d, and e in the first camp, and identifier information corresponding to the five game characters are sequentially set to 0, 1, 2, 3, and 4. During the setting of the skill identifiers, numbering may be sequentially performed from 0, and the skill representation vectors are sequentially numbered as 0, 1, 2, . . . , 19 from the first to the last. Each character corresponds to a 20-dimensional skill representation vector. When the action space is expanded to 100 dimensions, corresponding skill representation vectors are sequentially arranged according to the identifier information of the main action targets, and all skills are numbered from 0 to 99 to form the 100-dimensional action space. When the classification network layer 403 performs feature extraction on the second feature information and output the action probability distribution, whether a type of the skill is the attack skill or the defense skill may be determined, so that the action space only needs to be expanded to 100 dimensions instead of 200 dimensions.

In an embodiment of the present disclosure, after the valid action probability distribution is obtained, a skill and a main action target, that is, the target action character that the target game character uses during skill casting in a current turn may be determined according to the schematic flowchart shown in FIG. 5. For example, when a probability value corresponding to a skill identifier of the 44th dimension in the valid action probability distribution is largest, the target behavior information may be determined according to the skill identifier of the 44th dimension. Specifically, the skill identifier of the 44th dimension is 43, and each skill representation vector is 20 dimensions. Then, 43 may be divided by 20 to determine that a quotient is 2 and a remainder is 3. According to the remainder 3, the target skill may be determined as a skill, for example, the single-target magic attack skill of the third dimension in the skill representation vectors. The skill is the attack skill, and the target action character is determined as the No. 2 character in the opposing camp according to the quotient 2.

In an embodiment of the present disclosure, the actor network model is a policy neural network including a basic network layer and a multi-output classification network layer. Feature extraction is performed on the current game state information by using the basic network layer to obtain the first feature information, so that full utilization of environment information in a game may be ensured. Classification is performed on the second feature information by using the multi-output classification network layer to obtain the action probability distribution corresponding to each target game character, so that generation of collaborative camp actions may be ensured. Therefore, the actor network model in this embodiment of the present disclosure ensures unique action output of a plurality of characters while simplifying a problem of a plurality of intelligent agents. In addition, in this embodiment of the present disclosure, by combining an action space representation method in which skills and main action targets of different characters, character skills are effectively applied.

In an embodiment of the present disclosure, before the target behavior information of the game character is determined by using the actor network model, the actor network model needs to be trained, to obtain a stable actor network model, so as to ensure that the actor network model can output precise target behavior information during application, and the NPCs may intelligently cast skills to match a level of human players, thereby improving the playability of the games. The actor network model is a submodel in the reinforcement learning network model. During training, the whole reinforcement learning network model needs to be trained, that is, the actor network model and the critic network model are simultaneously trained. To differ from the actor network model in the foregoing embodiments, an actor network model in a deep learning network model is marked as an actor network model that is to be trained, and training of the deep learning network model is described in detail below.

Figure 6:
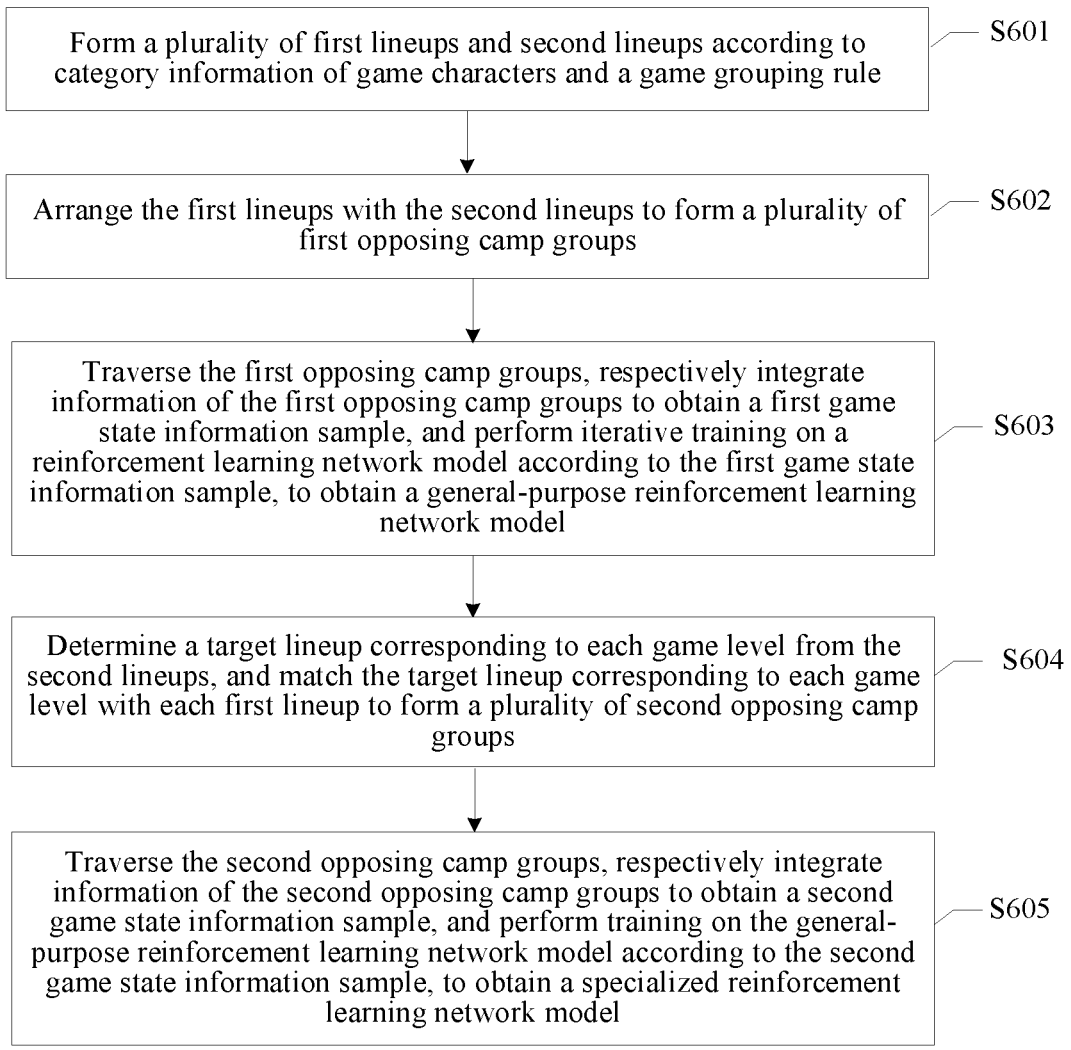
FIG. 6 is a schematic flowchart of staged self-play training according to an embodiment of the present disclosure.

In an embodiment of the present disclosure, since each level of the game corresponds to a specific NPC camp, a plurality of different NPC camps need to be generated according to different levels. In this embodiment of the present disclosure, model training may be performed by using a staged self-play training method. The staged self-play training includes two stages: general-purpose model training and specialized model training. FIG. 6 is a schematic flowchart of staged self-play training. As shown in FIG. 6, the following steps are included. Step S601: Form, based on a game grouping rule, a plurality of first lineups and second lineups according to category information of game characters. Step S602: Match the first lineups with the second lineups to form a plurality of first opposing camp groups. Step S603: Traverse the first opposing camp groups, respectively integrate information of the first opposing camp groups to obtain a first game state information sample, and perform iterative training on a reinforcement learning network model according to the first game state information sample, to obtain a general-purpose reinforcement learning network model. Step S604: Determine a target lineup corresponding to each game level from the second lineups, and match the target lineup corresponding to each game level with each first lineup to form a plurality of second opposing camp groups. Step S605: Traverse the second opposing camp groups, respectively integrate information of the second opposing camp groups to obtain a second game state information sample, and perform training on the general-purpose reinforcement learning network model according to the second game state information sample, to obtain a specialized reinforcement learning network model.

A process of model training is substantially to simulate a scene of an actual battle, and adjust two camps according to a battle between the two camps and a result of the battle. In an initial stage of the model training, the plurality of first lineups and second lineups are formed according to the game grouping rule and the category information of the game characters. Categories and attributes of characters played by the game players are the same as categories and attributes of the NPCs, and the two parties only different in the art representation. Therefore, a plurality of lineups may be formed according to the category information of the game characters, and all the plurality of lineups may be used as the first lineups or the second lineups. During the model training, training may be started based on a random policy. In other words, the first lineups are matched with the second lineups to form a plurality of first opposing camp groups, and the model is trained according to the first opposing camp groups. Specifically, all the first opposing camp groups are traversed, information of the first opposing camp groups is respectively integrated to obtain a first game state information sample, and iterative training is performed on the reinforcement learning network model according to the first game state information sample until performance of the model is not improved, to obtain a general-purpose reinforcement learning network model.

The general-purpose reinforcement learning network model is a general-purpose intelligent skill casting model.

However, not all lineups have an optimal game effect on each level. Therefore, specialized training may further be performed on the general-purpose reinforcement learning network model, that is, the specialized training is performed based on a policy corresponding to the general-purpose reinforcement learning network model, to adapt to characteristics of different lineups. Specifically, a target lineup corresponding to each game level may be determined from the second lineups, and the target lineup is respectively matched with the plurality of first lineups to form a plurality of second opposing camp groups. Subsequently, the second opposing camp groups are traversed, information of the second opposing camp groups is respectively integrated to obtain a second game state information sample, and perform training on the general-purpose reinforcement learning network model according to the second game state information sample, to obtain a specialized reinforcement learning network model. The specialized reinforcement learning network model is a reinforcement learning network model on which training has completed, and after training the actor network model that needs to be trained, it may be applied to the current game state information to obtain the target behavior information of the target game character.

Figure 7:
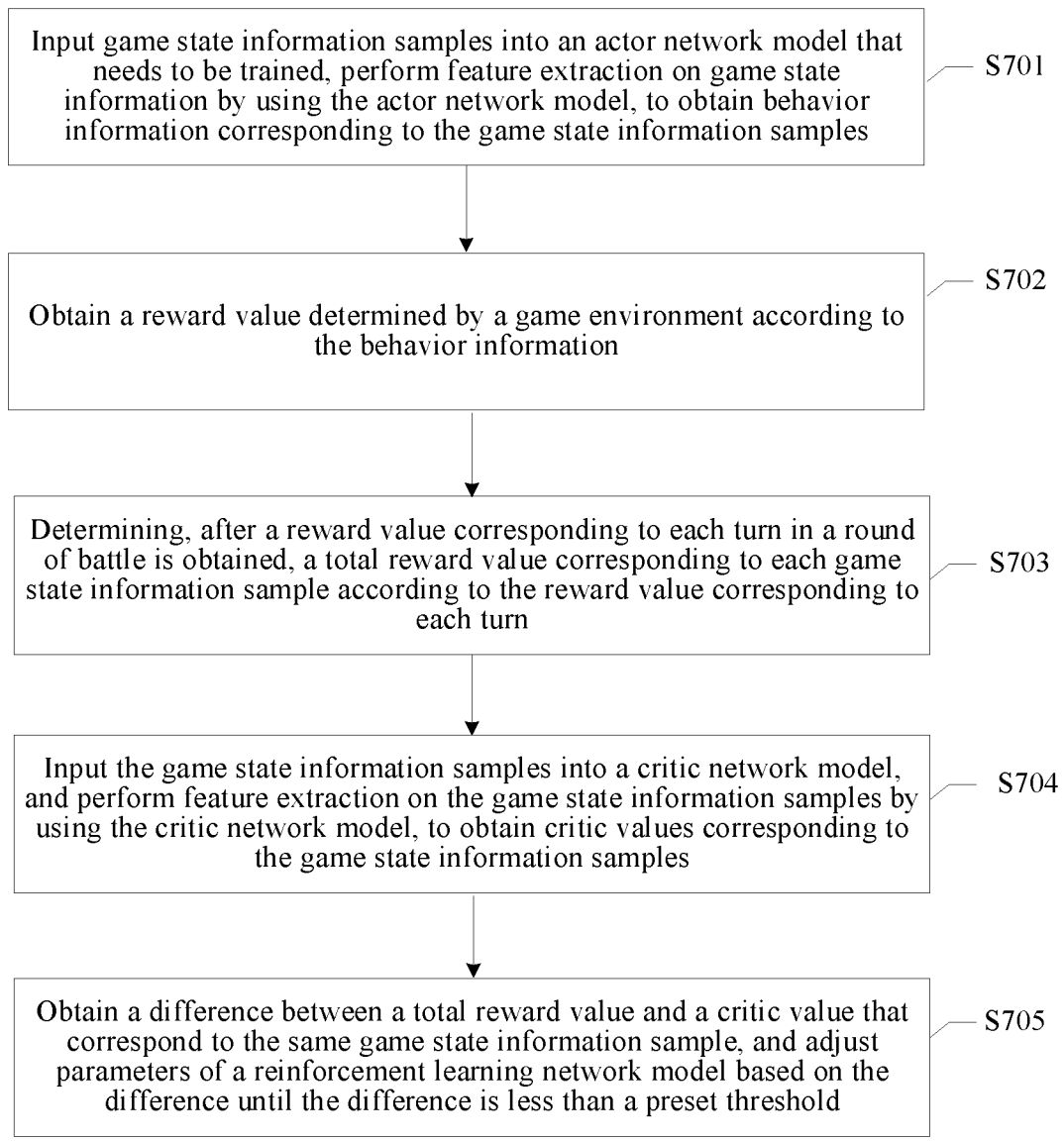
FIG. 7 is a specific schematic flowchart of performing training on a model according to game state information samples according to an embodiment of the present disclosure.

In an embodiment of the present disclosure, a training form in which generalization is adopted before specialization is used in the staged self-play training method. For a process of staged self-play training, a specific process of performing training on the model by using the first game state information sample or the second game state information sample (collectively referred to as game state information samples) is shown in FIG. 7. Step S701: Input the game state information samples into the actor network model that is to be trained, perform feature extraction on the game state information by using the actor network model that is to be trained, to obtain behavior information corresponding to the game state information samples. Step S702: Obtain a reward value determined by a game environment according to the behavior information. Step S703: Determine, after a reward value corresponding to each turn in a round of battle is obtained, a total reward value corresponding to each game state information sample according to the reward value corresponding to each turn. Step S704: Input the game state information samples into the critic network model, and perform feature extraction on the game state information samples by using the critic network model, to obtain assessment values corresponding to the game state information samples. Step S705: Obtain a difference between a total reward value and a assessment value that correspond to the same game state information sample, adjust parameters of the reinforcement learning network model based on the difference, and complete the training on the reinforcement learning network model until the difference is less than a preset threshold. Further, in step S705, a square of the difference between the total reward value and the assessment value may be calculated, to adjust the parameters of the reinforcement learning network model according to a value obtained by calculating the square of the difference.

Figure 8:
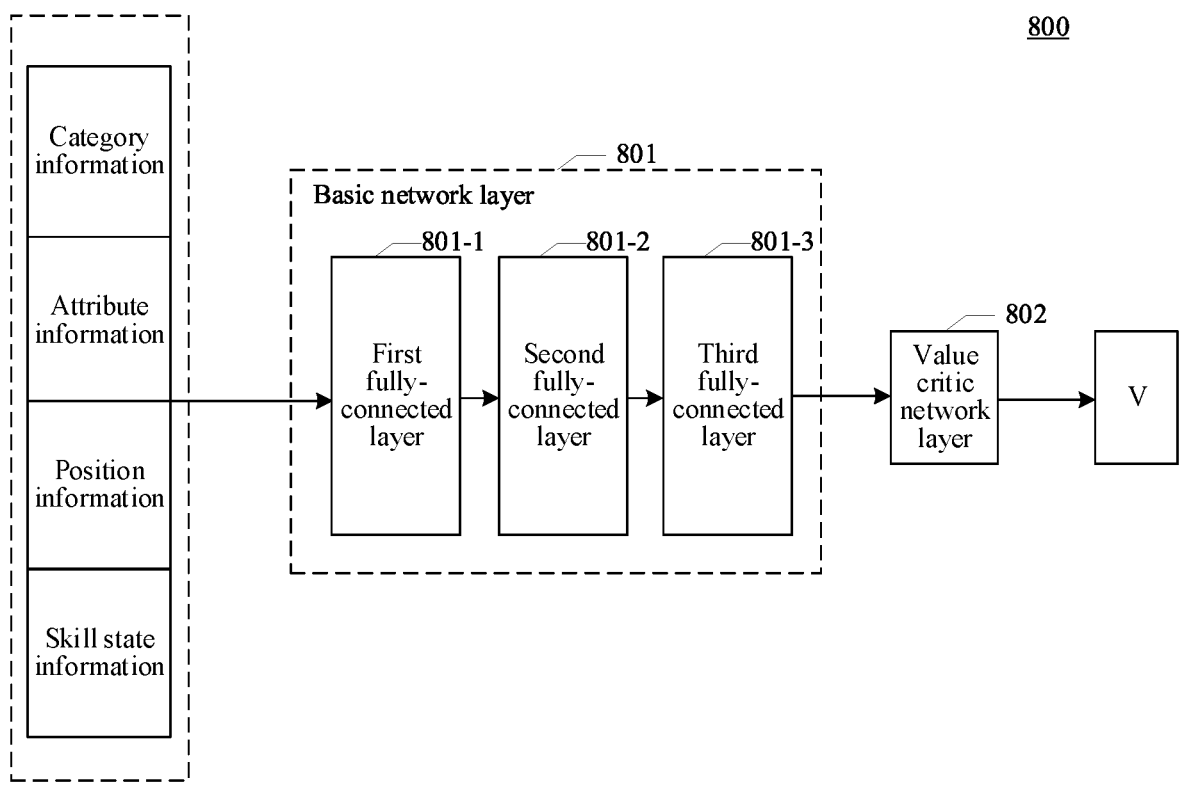
FIG. 8 is a schematic structural diagram of a critic network model according to an embodiment of the present disclosure.

In an embodiment of the present disclosure, FIG. 8 is a schematic structural diagram of a critic network model. As shown in FIG. 8, a critic network model 800 includes a basic network layer 801 and a value critic network layer 802. A structure of the basic network layer 801 is the same as a structure of the basic network layer 401 of the actor network model shown in FIG. 4. The basic network layer 801 further includes a first fully-connected layer 801-1, a second fully-connected layer 801-2, and a third fully-connected layer 801-3. Specifically, a dimension of the first fully-connected layer 801-1 is 1024, a dimension of the second fully-connected layer 801-2 is 512, and a dimension of the third fully-connected layer 801-3 is 256. The value critic network layer is a fully-connected layer with an output dimension of 1. After receiving the game state information samples, the critic network model 800 first performs feature extraction on the game state information samples by using the basic network layer 801 to obtain global information of the game environment, then performs feature extraction on the global information of the game environment by using the value critic network layer 802 and outputs a scalar. The scalar is a assessment value V corresponding to the game state information sample, and the assessment value V may measure, in a game state corresponding to the game state information sample, benefits expected to be obtained by a camp represented by the model.

In an embodiment of the present disclosure, game state information in a current battle turn in the game is inputted into the actor network model to generate a corresponding action, and the action is applied back to the game environment. In addition, a reward obtained by the action is calculated by using the game environment, and a round of battle is completed through continuous interaction between the game environment and the actor network model, to generate a data chain <state, action, reward value> of a continuous game segment. In addition, the game state information in the current battle turn is inputted into the critic network model to generate a corresponding assessment value. Subsequently, based on Monte Carlo sampling, a difference between a total reward value in each state in the continuous game segment and a assessment value in each state outputted by the critic network model is backtracked for calculation. The difference represents stability of the model. If the difference is relatively large, it indicates that the model is unstable and needs to be further trained. If the difference is relatively small, it indicates that the model tends to be stable. Finally, the parameters of the model are adjusted according to the difference, until the difference is smaller than the preset threshold. The preset threshold is a constant close to zero. In other words, the training of the model is completed when the total reward value is slightly different from or even the same as the assessment value.

In an embodiment of the present disclosure, auxiliary assessment may be performed with the help of a behavior tree intelligent skill casting solution after the staged self-play training. On the one hand, whether the trained model completes the training may be determined by comparing skill casting of the game character after self-play training and skill casting in the behavior tree, to implement intelligent skill casting of the game character. On the other hand, a character who casts skills according to the model fights against a character who casts skills intelligently according to the behavior tree, and whether the model completes the training is determined according to a fighting result, to implement intelligent skill casting of the game character.

The game character behavior control method provided in this embodiment of the present disclosure is implemented based on a reinforcement learning network model. Target behavior information corresponding to a plurality of target game characters, that is, skills and main actions targets used by the target game characters in a current game state is generated according to current game state information in a game environment by using an actor network model. The method may mainly be used for intelligent skill casting of NPCs in a multiplayer turn-based PRG, and the method may further be used to implement an automatic intelligent battle hosting function on a side of a human player.

In an embodiment of the present disclosure, when there are one or more human players in first lineups select the automatic intelligent battle hosting function, state information of characters played by the human players in the first lineups in a current game scene may be obtained, and current game state information may be determined according to the state information of the characters played by the human players; then the current game state information may be inputted into the actor network model, and feature extraction is performed on the current game state information by using the actor network model to obtain target behavior information of the human players in the first lineups; and finally the target behavior information corresponding to the human players who enable an intelligent battle hosting function is selected for battle. Accordingly, functional integrity of the game is ensured. A specific process of performing feature extraction on the current game state information by using the actor network model to obtain target behavior information of the human players in the first lineups is the same as the process of obtaining the target behavior information corresponding to the target game characters in the foregoing embodiments. Therefore, details are not described herein again.

In an embodiment of the present disclosure, the game character behavior control method provided in this embodiment of the present disclosure may further be used in a 1v1 turn-based PRG. In a process of determining current game state information, category information, attribute information, and skill state information of two game characters are obtained, and the current game state information is constructed according to the category information, the attribute information, and the skill state information of the two game characters. Subsequently, the current game state information is inputted into a basic network layer to obtain global feature information of a current game. Next, the global feature information is connected to category information of the target game character and is inputted into a classification network layer, to enable the classification network layer to output an action probability distribution corresponding to the target game character. Further next, invalid skills in the action probability distribution are screened according to the skill state information of the target game character, to obtain a valid action probability distribution. Finally, the target behavior information corresponding to the target game character may be determined according to the valid action probability distribution. When there is one target game character, the classification network layer only needs to set one fully-connected layer for output, and there is no need to set a plurality of outputs.

According to technical solutions of the present disclosure, on the one hand, intelligent skill casting of the game characters can be generated based on the reinforcement learning network model, so that an intelligent battle level of the NPCs is improved, and the level of the NPCs matches the human players, thereby improving playability of games and further improving user experience. On the other hand, the skill casting of the game characters is generated without using a decision tree method and a supervised learning method, which consumes less time. In addition, intelligent skill casting of the game characters may be implemented without acquiring a large amount of real game data.

Figure 2B:
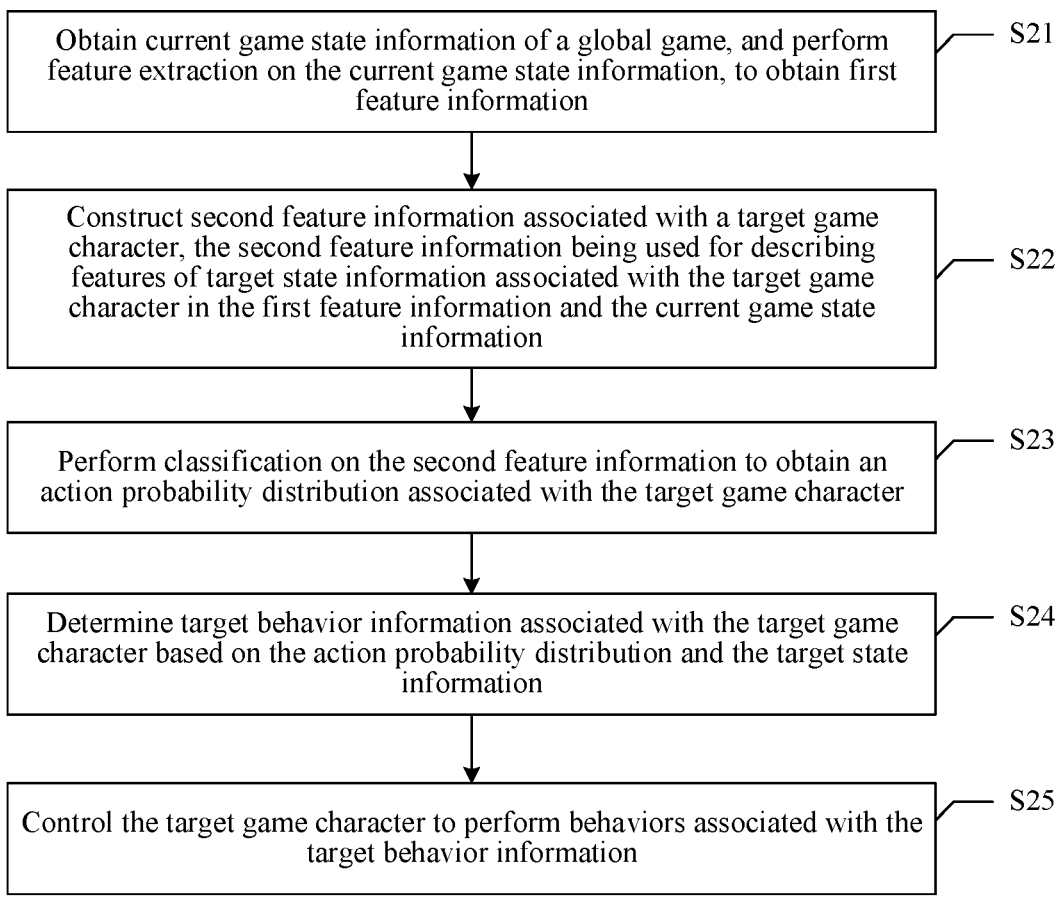
FIG. 2B is a schematic flowchart of a game character behavior control method according to an embodiment of the present disclosure.

FIG. 2B is a schematic flowchart of a game character behavior control method according to an embodiment of the present disclosure. The game character behavior control method may specifically be implemented by a server, for example, the server 103 shown in FIG. 1. As shown in FIG. 2B, steps S21 to S24 are respectively similar to steps S201 to S204 in FIG. 2A, and details are not described herein again.

Step S25: Control the target game character to perform actions corresponding to the target behavior information.

In the embodiments, the target game character is a game character currently controlled by game logic. For example, the target game character may be an NPC in a game. In another example, the target game character may be a character that a player entrusts a game platform to control, that is, a character previously controlled by the player and entrusted to be controlled by the game platform when the player cannot continuously play the game due to an emergency. The game platform may provide an entry on a game interface. The player performs an operation on the entry when hosting is required, and the game platform controls behaviors of the character on behalf of the player after receiving an instruction triggered by the player who performs the operation on the entry.

Apparatus embodiments of the present disclosure are described below, which may be used to perform the game character behavior control method provided in the foregoing embodiments of the present disclosure. For details not disclosed in the apparatus embodiments of the present disclosure, reference may be made to the foregoing embodiments of the game character behavior control method in the present disclosure.

Figure 9:
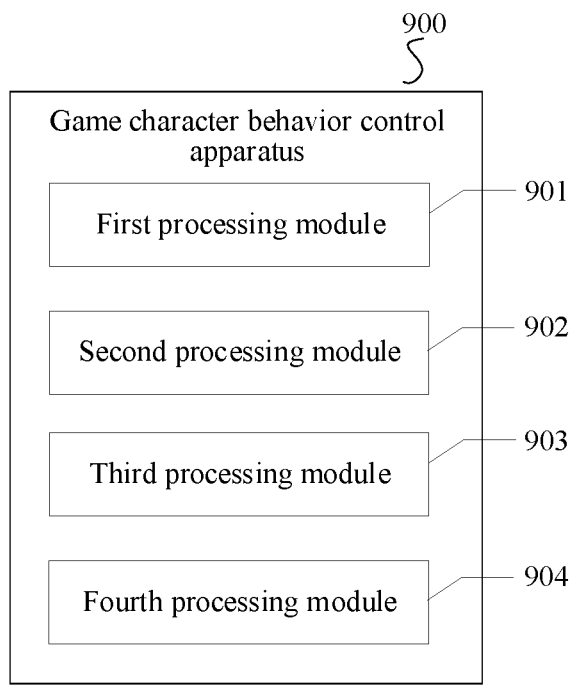
FIG. 9 is a schematic block diagram of a game character behavior control apparatus according to an embodiment of the present disclosure.

FIG. 9 is a schematic block diagram of a game character behavior control apparatus according to an embodiment of the present disclosure. The game character behavior control apparatus may be a computer program (including program code) run on an electronic device. For example, the game character behavior control apparatus is application software. The apparatus may be configured to implement relevant steps in the method provided in the embodiments of the present disclosure.

Referring to FIG. 9, a game character behavior control apparatus 900 according to an embodiment of the present disclosure includes: a first processing module 901, a second processing module 902, a third processing module 903, and a fourth processing module 904.

The first processing module 901 is configured to: obtain current game state information of a game, and perform feature extraction on the current game state information, to obtain first feature information. The second processing module 902 is configured to: construct second feature information corresponding to a target game character according to target state information corresponding to the target game character in the first feature information and the current game state information. The third processing module 903 is configured to: perform classification on the second feature information, to obtain an action probability distribution corresponding to the target game character. The fourth processing module 904 is configured to: determine target behavior information corresponding to the target game character based on the action probability distribution and the target state information.

In an embodiment of the present disclosure, the first processing module 901 is configured to: determine a first camp and a second camp in a current game level, the first camp including a plurality of game characters, and the second camp including a plurality of target game characters; obtain category information, attribute information, skill state information, and position information of the game characters in the first camp, and simultaneously obtain category information, attribute information, skill state information, and position information of the target game characters in the second camp; and obtain the current game state information according to the category information, the attribute information, the skill state information, and the position information of the game characters in the first camp, and the category information, the attribute information, the skill state information, and the position information of the target game characters in the second camp.

In an embodiment of the present disclosure, the first processing module 901 includes: a first feature extraction unit, configured to: input the current game state information into a basic network layer of an actor network model, and perform multi-level feature extraction on the current game state information by using the basic network layer, to obtain the first feature information.

In an embodiment of the present disclosure, the basic network layer includes a first fully-connected layer, a second fully-connected layer, and a third fully-connected layer of different dimensions. The first feature extraction unit is configured to: perform feature extraction on the current game state information by using the first fully-connected layer, to obtain primary feature information; perform feature extraction on the primary feature information by using the second fully-connected layer, to obtain secondary feature information; and perform feature extraction on the secondary feature information by using the third fully-connected layer, to obtain the first feature information.

In an embodiment of the present disclosure, the actor network model further includes a connection network layer. The second processing module 902 is configured to: connect the first feature information to the category information corresponding to the target game character by using the connection network layer, to obtain the second feature information.

In an embodiment of the present disclosure, the actor network model further includes a classification network layer. The third processing module 903 includes: a second feature extraction unit, configured to: input the second feature information into the classification network layer, and perform classification on the second feature information by using the classification network layer, to obtain the action probability distribution.

In an embodiment of the present disclosure, the classification network layer includes a plurality of sub-classification networks, and a quantity of sub-classification networks is the same as a quantity of target game characters. The second feature extraction unit is configured to: respectively perform classification on the second feature information corresponding to the target game characters by using the sub-classification networks, to obtain action probability distributions corresponding to the target game characters.

In an embodiment of the present disclosure, the fourth processing module 904 includes: a skill screening unit, configured to: screen invalid skills in the action probability distributions corresponding to the target game characters according to skill state information corresponding to the target game characters in the current game state information, to obtain valid action probability distributions; and a behavior determining unit, configured to: determine target behavior information corresponding to the target game characters according to the valid action probability distributions.

In an embodiment of the present disclosure, the behavior determining unit is configured to: obtain a skill identifier having a maximum probability value in the valid action probability distributions; divide the skill identifier having the maximum probability value by a dimension of the skill state information, to obtain a quotient and a remainder; and determine a target skill according to the remainder, simultaneously determine a target action character according to the quotient, and determine the target behavior information according to the target skill and the target action character.

In an embodiment of the present disclosure, the game character behavior control method is further configured to: form, based on a game grouping rule, a plurality of first lineups and second lineups according to the category information of the game characters; freely match the first lineups with the second lineups to form a plurality of first opposing camp groups; traverse the first opposing camp groups, respectively integrate information of the first opposing camp groups to obtain a first game state information sample, and perform iterative training on a reinforcement learning network model according to the first game state information sample, to obtain a general-purpose reinforcement learning network model; determine a target lineup corresponding to each game level from the second lineups, and respectively match the target lineup and the first lineups to form a plurality of second opposing camp groups; and traverse the second opposing camp groups, respectively integrate information of the second opposing camp groups to obtain a second game state information sample, and perform training on the general-purpose reinforcement learning network model according to the second game state information sample, to obtain a specialized reinforcement learning network model.

In an embodiment of the present disclosure, the reinforcement learning network model includes a actor network model that is to be trained and a critic network model, the critic network model including the basic network layer and a value critic network layer, the value critic network layer being a fully-connected layer with an output dimension of 1.

In an embodiment of the present disclosure, the performing training on a reinforcement learning network model according to the game state information samples including: inputting the game state information samples into the actor network model that is to be trained, performing feature extraction on the game state information by using the actor network model that is to be trained, to obtain behavior information corresponding to the game state information samples; obtaining a reward value determined by a game environment according to the behavior information; determining, after a reward value corresponding to each turn in a round of battle is obtained, a total reward value corresponding to each game state information sample according to the reward value corresponding to each turn; inputting the game state information samples into the critic network model, and performing feature extraction on the game state information samples by using the critic network model, to obtain assessment values corresponding to the game state information samples; and obtaining a difference between a total reward value and a assessment value that correspond to the same game state information sample, and adjusting parameters of the reinforcement learning network model based on the difference until the difference is less than a preset threshold.

Figure 10:
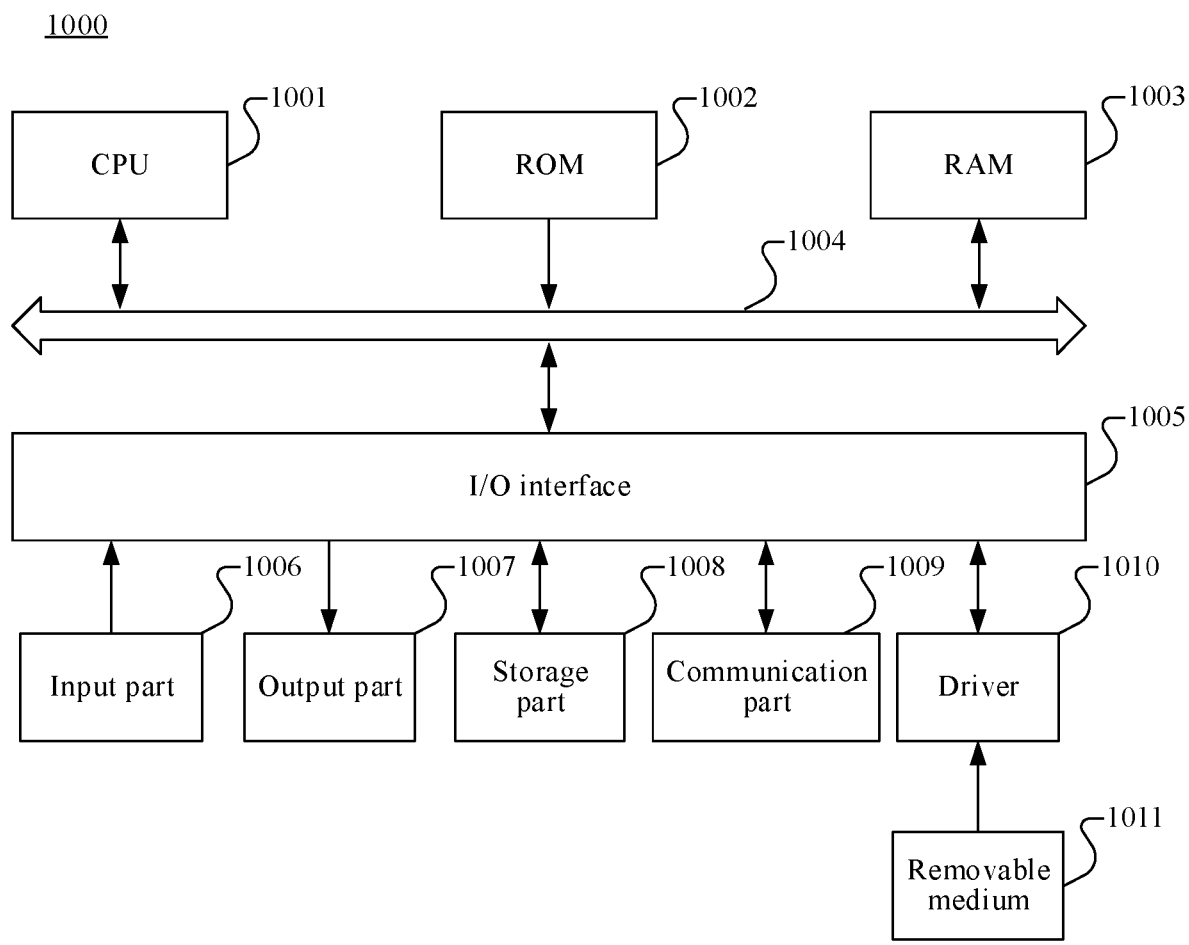
FIG. 10 is a schematic structural diagram of a computer system adapted to implement an electronic device according to an embodiment of the present disclosure.

FIG. 10 is a schematic structural diagram of a computer system adapted to implement an electronic device according to an embodiment of the present disclosure.

A computer system 1000 of the electronic device shown in FIG. 10 is merely an example, and does not constitute any limitation to functions and use ranges of the embodiments of the present disclosure.

As shown in FIG. 10, the computer system 1000 includes a central processing unit (CPU) 1001. The CPU 1001 may perform various appropriate actions and processing according to a program stored in a read-only memory (ROM) 1002 or a program loaded from a storage portion 1008 into a random access memory (RAM) 1003, to implement the game character behavior control method described in the foregoing embodiments. The RAM 1003 further stores various programs and data required for system operations. The CPU 1001, the ROM 1002, and the RAM 1003 are connected to each other by using a bus 1004. An input/output (I/O) interface 1005 is also connected to the bus 1004.

The following components are connected to the I/O interface 1005: an input part 1006 including a keyboard, a mouse, or the like, an output part 1007 including a cathode ray tube (CRT), a liquid crystal display (LCD), a speaker, or the like, a storage part 1008 including a hard disk, or the like, and a communication part 1009 including a network interface card such as a local area network (LAN) card or a modem. The communication part 1009 performs communication processing by using a network such as the Internet. A driver 1010 is also connected to the I/O interface 1005 as required. A removable medium 1011, such as a magnetic disk, an optical disc, a magneto-optical disk, or a semiconductor memory, is installed on the drive 1010 as required, so that a computer program read from the removable medium is installed into the storage part 1008 as required.

Particularly, according to an embodiment of the present disclosure, the processes described below by referring to the flowcharts may be implemented as computer software programs. For example, the embodiments of the present disclosure include a computer program product, including a computer program carried on a computer readable medium. The computer program includes program code for performing the method shown in the flowchart. In such an embodiment, the computer program may be downloaded and installed from a network through the communication part 1009, and/or installed from the removable medium 1011. When the computer program is executed by the CPU 1001, various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal included in a baseband or propagated as a part of a carrier, the data signal carrying computer-readable program code. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wired medium, or the like, or any suitable combination thereof.

Flowcharts and block diagrams in the drawings illustrate architectures, functions, and operations that may be implemented by using the system, the method, and the computer program product according to the various embodiments of the present disclosure. In this regard, each box in a flowchart or a block diagram may represent a module, a program segment, or a part of code. The module, the program segment, or the part of code includes one or more executable instructions used for implementing designated logic functions. In some embodiments used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented by software components, or may be implemented by hardware components, and the described units may also be disposed in a processor. Names of the units do not constitute a limitation on the units in a specific case.

According to another aspect, the present disclosure further provides a computer-readable medium. The computer-readable medium may be included in the game character behavior control apparatus described in the foregoing embodiments, or may exist alone and is not assembled in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the embodiments of the present disclosure, the features and functions of two or more modules or units described above may be specifically implemented in one module or unit. On the contrary, the features and functions of one module or unit described above may be further divided to be embodied by a plurality of modules or units.

According to the foregoing descriptions of the embodiments, a person skilled in the art may readily understand that the exemplary embodiments described herein may be implemented by using software, or may be implemented by combining software and necessary hardware. Therefore, the technical solutions according to the embodiments of the present disclosure may be implemented in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the embodiments of the present disclosure.

After considering the specification and practicing the present disclosure, a person skilled in the technology may easily conceive of other embodiments of the present disclosure. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the related art.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A game character behavior control method, performed by a server, the method comprising:
    obtaining current game state information of a game, and performing feature extraction on the current game state information, to obtain first feature information that reflects parameters of game characters of opposing parties in the game;
    constructing second feature information associated with a target game character, the second feature information reflecting the first feature information and features of target state information associated with the target game character in the current game state information, the target game character being controlled by game logic;
    performing classification on the second feature information to obtain action probability distribution associated with the target game character;
    determining target behavior information based on an action probability distribution and target state information associated with the target game character; and
    controlling the target game character to perform actions associated with the target behavior information.

2. The game character behavior control method according to claim 1, wherein the obtaining current game state information of a game comprises:
    determining a first camp and a second camp in a current game level, the first camp comprising a plurality of game characters, and the second camp comprising a plurality of target game characters;
    obtaining category information, attribute information, skill state information, and position information of the game characters in the first camp, and obtaining category information, attribute information, skill state information, and position information of the target game characters in the second camp; and
    obtaining the current game state information according to the category information, the attribute information, the skill state information, and the position information of the game characters in the first camp and in the second camp.

3. The game character behavior control method according to claim 1, wherein the performing feature extraction on the current game state information, to obtain first feature information comprises:
    inputting the current game state information into a basic network layer of an actor network model, and performing multi-level feature extraction on the current game state information by using the basic network layer, to obtain the first feature information.

4. The game character behavior control method according to claim 3, wherein the actor network model further comprises a connection network layer; and
    the constructing second feature information associated with the target game character comprises:
    connecting the first feature information to the category information corresponding to the target game character using the connection network layer, to obtain the second feature information.

5. The game character behavior control method according to claim 4, wherein the actor network model further comprises a classification network layer; and
    the performing classification on the second feature information to obtain an action probability distribution corresponding to the target game character comprises:
    inputting the second feature information into the classification network layer, and performing classification on the second feature information by using the classification network layer, to obtain the action probability distribution.

6. The game character behavior control method according to claim 5, wherein the classification network layer comprises a plurality of sub-classification networks, and a quantity of sub-classification networks is the same as a quantity of target game characters; and
    the performing classification on the second feature information by using the classification network layer, to obtain the action probability distributions comprises:
    respectively performing classification on the second feature information associated with the target game characters by using the sub-classification networks, to obtain the action probability distributions corresponding to the target game characters.

7. The game character behavior control method according to claim 6, wherein the determining target behavior information corresponding to the target game character based on the action probability distribution and the target state information comprises:
    screening invalid skills in the action probability distribution associated with the target game characters according to skill state information associated with the target game character in the current game state information, to obtain a valid action probability distribution; and
    determining the target behavior information corresponding to the target game character according to the corresponding valid action probability distribution.

8. The game character behavior control method according to claim 7, wherein the determining target behavior information associated with the target game character according to the valid action probability distribution comprises:
    obtaining a skill identifier having a maximum probability value in the valid action probability distribution;
    dividing the skill identifier having the maximum probability value by a dimension of the skill state information, to obtain a quotient and a remainder; and
    determining a target skill according to the remainder, determining a target action character according to the quotient, and determining the target behavior information according to the target skill and the target action character.

9. The game character behavior control method according to claim 1, further comprising:
    forming, a plurality of first lineups and second lineups according to category information of the game characters and a game grouping rule;
    arranging the first lineups with the second lineups to form a plurality of first opposing camp groups;

traversing the first opposing camp groups, respectively integrating information of the first opposing camp groups to obtain a first game state information sample; and performing iterative training on a reinforcement learning network model according to the first game state information sample, to obtain a general-purpose reinforcement learning network model.

10. The game character behavior control method according to claim 9, further comprising:

identifying a target lineup corresponding to each game level from the second lineups, and arranging the target lineup with each of the first lineups to form a plurality of second opposing camp groups;

traversing the second opposing camp groups, respectively integrating information of the second opposing camp groups to obtain a second game state information sample; and performing iterative training on the general-purpose reinforcement learning network model according to the second game state information sample, to obtain a specialized reinforcement learning network model.

11. The game character behavior control method according to claim 10, wherein the reinforcement learning network model comprises an actor network model that is to be trained with a critic network model, the critic network model comprising the basic network layer and a value critic network layer, the value critic network layer being a fully-connected layer with an output dimension of 1.

12. The game character behavior control method according to claim 10, wherein the performing iterative training on the reinforcement learning network model or the general-purpose reinforcement learning network model according to the first or second game state information sample, respectively, comprises:

iteratively determining a difference between a total reward value and an assessment value based on the first or second game state information sample, and adjusting parameters of the reinforcement learning network model or the general-purpose reinforcement learning network model until the difference is less than a first threshold value or a second threshold value respectively.

13. The game character behavior control method according to claim 12, wherein iteratively determining a difference between a total reward value and an assessment value comprises, in each iteration:

inputting a first or second game state information sample into the actor network model, performing feature extraction on the first or second game state information by using the actor network model, to obtain behavior information corresponding to the first or the second game state information sample;

obtaining a reward value determined by a game environment according to the behavior information for each turn in a round of battle;

determining, a total reward value corresponding to the first or the second game state information sample according to the reward value for each turn in the round of battle;

inputting the first or the second game state information sample into the critic network model, and performing feature extraction on the first or second game state information sample using the critic network model, to obtain an assessment value corresponding to the first or the second game state information sample; and determining a difference between the total reward value and the assessment value associated with the first or the second game state information sample, and adjusting parameters of the reinforcement learning network model or the general-purpose reinforcement learning network model respectively.

14. A game character behavior control apparatus, comprising: a memory and a processor coupled to the memory, the processor is configured to:

obtain current game state information of a game, and performing feature extraction on the current game state information, to obtain first feature information that reflects parameters of game characters of opposing parties in the game;

construct second feature information associated with a target game character, the second feature information reflecting the first feature information and features of target state information associated with the target game character in the current game state information, the target game character being controlled by game logic;

perform classification on the second feature information to obtain action probability distribution associated with the target game character;

determine target behavior information based on an action probability distribution and target state information associated with the target game character; and control the target game character to perform actions associated with the target behavior information.

15. The game character behavior control apparatus according to claim 14, wherein the processor is configured to:

determine a first camp and a second camp in a current game level, the first camp comprising a plurality of game characters, and the second camp comprising a plurality of target game characters;

obtain category information, attribute information, skill state information, and position information of the game characters in the first camp, and obtaining category information, attribute information, skill state information, and position information of the target game characters in the second camp; and obtain the current game state information according to the category information, the attribute information, the skill state information, and the position information of the game characters in the first camp and in the second camp.

16. The game character behavior control apparatus according to claim 14, wherein the processor is configured to:

input the current game state information into a basic network layer of an actor network model, and performing multi-level feature extraction on the current game state information by using the basic network layer, to obtain the first feature information.

17. The game character behavior control apparatus according to claim 16, wherein the actor network model further comprises a connection network layer, and the processor is further configured to:

connect the first feature information to the category information corresponding to the target game character using the connection network layer, to obtain the second feature information.

18. The game character behavior control apparatus according to claim 17, wherein the actor network model further comprises a classification network layer, and the processor is further configured to:
- input the second feature information into the classification network layer, and performing classification on the second feature information by using the classification network layer, to obtain the action probability distribution.

19. The game character behavior control apparatus according to claim 18, wherein the classification network layer comprises a plurality of sub-classification networks, and a quantity of sub-classification networks is the same as a quantity of target game characters; and the processor is further configured to:
- respectively perform classification on the second feature information associated with the target game characters by using the sub-classification networks, to obtain the action probability distributions corresponding to the target game characters.

20. A non-transitory computer-readable storage medium, storing a computer program, the computer program, when executed by a processor, implementing:

- obtaining current game state information of a game, and performing feature extraction on the current game state information, to obtain first feature information that reflects parameters of game characters of opposing parties in the game;
- constructing second feature information associated with a target game character, the second feature information reflecting the first feature information and features of target state information associated with the target game character in the current game state information, the target game character being controlled by game logic;
- performing classification on the second feature information to obtain action probability distribution associated with the target game character;
- determining target behavior information based on an action probability distribution and target state information associated with the target game character; and
- controlling the target game character to perform actions associated with the target behavior information.

* * * * *